(12) United States Patent
Buzdugan

(10) Patent No.: US 8,611,877 B2
(45) Date of Patent: Dec. 17, 2013

(54) AUTOMATIC MANAGEMENT CONTROL OF EXTERNAL RESOURCES

(75) Inventor: Marian Constantin Buzdugan, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/285,737

(22) Filed: Oct. 31, 2011
(Under 37 CFR 1.47)

(65) Prior Publication Data
US 2013/0109365 A1 May 2, 2013

(51) Int. Cl.
*H04M 3/42* (2006.01)

(52) U.S. Cl.
USPC ...... 455/416; 455/550.1; 455/518; 379/93.21

(58) Field of Classification Search
USPC .................. 455/416, 550.1, 518; 379/93.21
See application file for complete search history.

(56) References Cited

U.S. PATENT DOCUMENTS

| | | | |
|---|---|---|---|
| 4,544,804 A | 10/1985 | Herr et al. | |
| 5,212,726 A | 5/1993 | Dayner et al. | |
| 5,373,549 A | 12/1994 | Bales et al. | |
| 5,859,979 A | 1/1999 | Tung et al. | |
| 5,973,724 A | 10/1999 | Riddle | |
| 7,161,926 B2 | 1/2007 | Elson et al. | |
| 7,353,251 B1 | 4/2008 | Balakrishnan | |
| 7,697,490 B2 | 4/2010 | Dssouli et al. | |
| 7,822,186 B1 | 10/2010 | Boni | |
| 7,849,138 B2 | 12/2010 | Gu et al. | |
| 7,865,180 B2 | 1/2011 | Davis et al. | |
| 7,933,621 B1 | 4/2011 | Vu et al. | |
| 2003/0223562 A1 | 12/2003 | Cui et al. | |
| 2005/0063313 A1 | 3/2005 | Nanavati et al. | |
| 2006/0270447 A1 * | 11/2006 | Everson et al. | 455/552.1 |
| 2007/0002779 A1 * | 1/2007 | Lee et al. | 370/260 |
| 2007/0086365 A1 | 4/2007 | Chen et al. | |
| 2007/0091169 A1 | 4/2007 | Zhang et al. | |
| 2007/0264989 A1 | 11/2007 | Palakkal et al. | |
| 2007/0285503 A1 * | 12/2007 | Asthana et al. | 348/14.08 |
| 2008/0239995 A1 | 10/2008 | Lee et al. | |
| 2009/0086951 A1 | 4/2009 | Geppert et al. | |
| 2009/0089683 A1 | 4/2009 | Thapa | |
| 2010/0007713 A1 | 1/2010 | Yamamoto | |
| 2012/0128322 A1 * | 5/2012 | Shaffer et al. | 386/241 |
| 2012/0278735 A1 * | 11/2012 | Singh | 715/753 |

FOREIGN PATENT DOCUMENTS

| | | |
|---|---|---|
| EP | 1895776 | 3/2008 |
| WO | 02/087204 | 10/2002 |
| WO | WO 2010/111867 | 10/2010 |

OTHER PUBLICATIONS

Extended European Search Report mailed Apr. 4, 2012, for European Application No. 11187299.0.

* cited by examiner

*Primary Examiner* — Danh Le

(74) *Attorney, Agent, or Firm* — Finnegan, Henderson, Farabow, Garrett & Dunner, LLP

(57) ABSTRACT

Presented are systems and methods for receiving one or more generic commands when coupled to a heterogeneous conference call, the conference call including a plurality of participants coupled to the conference call using one or more mobile devices. The system automatically translates, by a control module the one or more generic commands into one or more native commands recognized by a first conference hosting system, of the plurality of conference hosting systems. The system automatically sends the one or more native commands to the first conference hosting system.

26 Claims, 7 Drawing Sheets

FIG. 3A          FIG. 3B

AUTOMATIC MANAGEMENT CONTROL OF EXTERNAL RESOURCES

FIELD

Example embodiments relate to conference call systems and methods, and in particular to a method for automating user control during a conference call.

BACKGROUND

In general, there are three common conference hosting systems for executing conferencing calls: using a mobile device as the conference bridge (mobile bridge), using an intermediate conference server (for example a private branch exchange (PBX)), and using a conference bridge. The mobile bridge typically provides the fewest number of participants and number of moderator controls. The intermediate conference server generally can host larger conferences and provide an increased number of moderator controls. Additionally, the conference bridge generally can host an even larger number of participants and generally provides the moderator with the most controls.

Currently, the methods of generating conference calls are generally limited to a single conference hosting system. For example, a conference call is hosted either by only the intermediate conference server or only the conference bridge.

Moreover, each conference hosting system can have separate command formats making interoperability difficult if commands are to be passed between devices coupled to the conference via different types of conference hosting systems. Additionally, each type of conference hosting system can have different controls available to conferences participants and different user interfaces for accessing those controls.

BRIEF DESCRIPTION OF THE DRAWINGS

Reference will now be made to the accompanying drawings showing example embodiments of the present application, and in which:

FIG. 3A shows an example conference call using a mobile bridge;

FIG. 3B shows an example heterogeneous conference call with a mobile bridge and an intermediate conference server;

DESCRIPTION OF EXAMPLE EMBODIMENTS

The example embodiments provided below describe a device control system and method where a user control graphical user interface (GUI) operating on a device allows a user to perform actions relating to a conference call (conference). The device control system can operate in a conference utilizing a single type of conference resource, for example a homogenous conference. Additionally, the device control system can operate in a conference using different types of conference hosting systems coupled through one or more servers, for example, a heterogeneous conference. A heterogeneous conference is a conference call (audio, video, or a combination thereof) that includes a plurality of different conference hosting systems that are coupled together through a server. A conference hosting system can be a mobile bridge, an intermediate conference server (for example a private branch exchange (PBX)), a conference bridge, or a media server. The device control system sends generic commands to the server, wherein the server is configured to translate those commands into formats recognizable by one or more conference hosting systems participating in the conference.

In additional embodiments, the generic commands are translated on the mobile device into formats recognizable by a conference hosting system participating in the conference. The mobile device can then send the commands to the server, which then routes the commands to the appropriate conference hosting systems. Or in some embodiments, the mobile device sends the command directly to the conference hosting system.

Figure 1:
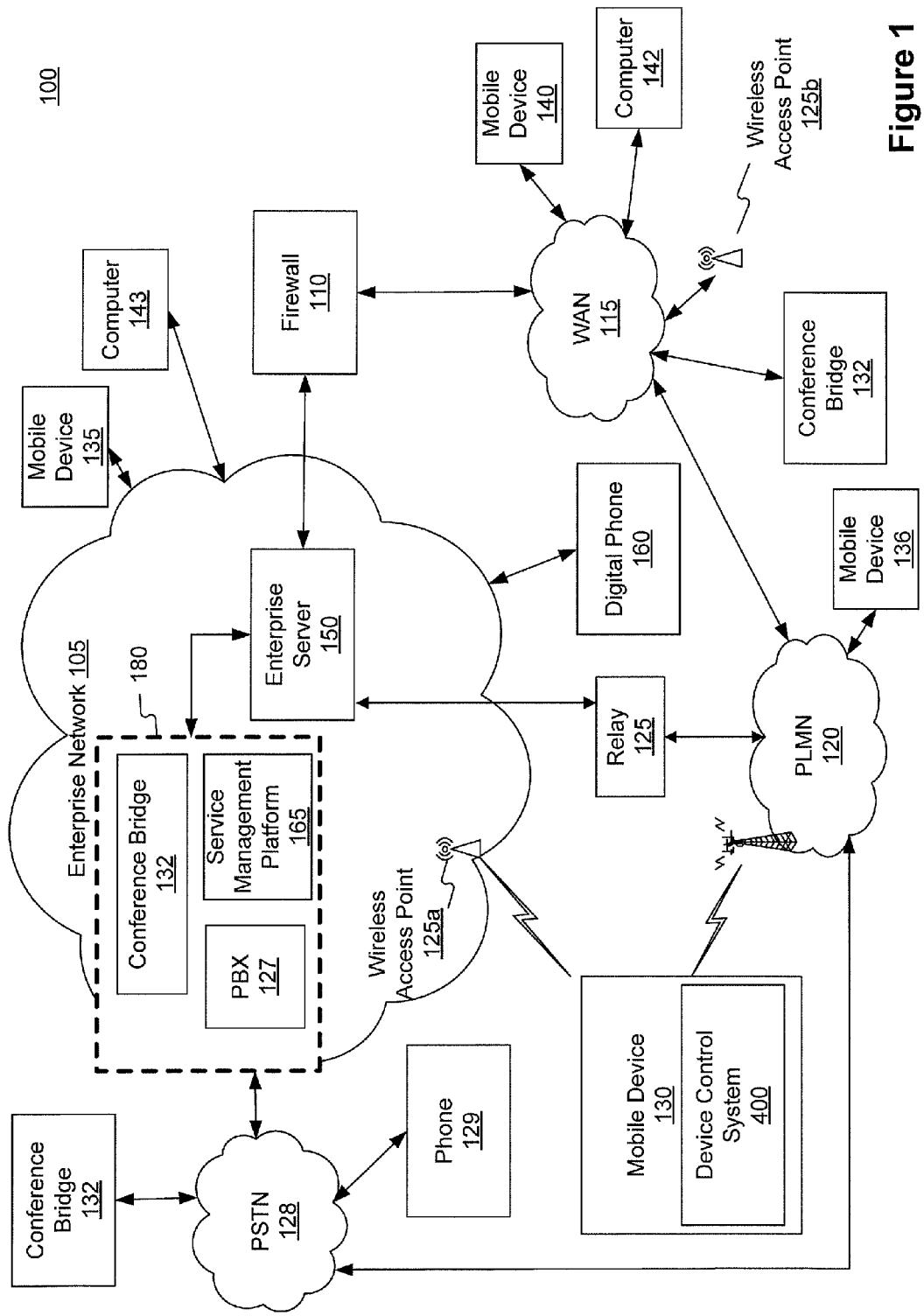
FIG. 1 shows, in block diagram form, an example system utilizing a device control system.

Reference is now made to FIG. 1, which shows, in block diagram form, an example system utilizing a device control system for managing and automating user controls in conferences (homogenous and heterogeneous), generally designated 100, for the control and management of communications. System 100 includes an enterprise network 105, which in some embodiments includes a local area network (LAN). In some embodiments, enterprise network 105 can be an enterprise or business system. In some embodiments, enterprise network 105 includes more than one network and is located in multiple geographic areas.

Enterprise network 105 can be coupled, often through a firewall 110, to a wide area network (WAN) 115, such as the Internet. Enterprise network 105 can also be coupled to a public switched telephone network (PSTN) 128 via direct inward dialing (DID) trunks or primary rate interface (PRI) trunks.

Enterprise network 105 can also communicate with a public land mobile network (PLMN) 120, which is also referred to as a wireless wide area network (WWAN) or, in some cases, a cellular network. The connection with PLMN 120 is via a relay 125, as known in the art.

In some embodiments, enterprise network 105 provides a wireless local area network (WLAN), not shown, featuring wireless access points, such as wireless access point 125a. In some embodiments, other WLANs can exist outside enterprise network 105. For example, a WLAN coupled to WAN 115 can be accessed via wireless access point 125b. WAN 115 is coupled to one or more mobile devices, for example mobile device 140. Additionally, WAN 115 can be coupled to one or more desktop or laptop computers 142 (one shown).

System 100 can include a number of enterprise-associated mobile devices, for example, mobile devices 130, 135, 136, and 140. Mobile devices 130, 135, 136, and 140 can include devices equipped for cellular communication through PLMN 120, mobile devices equipped for Wi-Fi communications over one of the WLANs via wireless access points 125a or 125b, or dual-mode devices capable of both cellular and WLAN communications. Wireless access points 125a or 125b can be configured to WLANs that operate in accordance with one of the IEEE 802.11 specifications.

Mobile devices 130, 135, 136, and 140 can be, for example, cellular phones, smartphones, tablets, netbooks, and a PDA (personal digital assistant) enabled for wireless communication. Moreover, mobile devices 130, 135, 136, and 140 can communicate with other components using voice communications or data communications (such as accessing content from a website). Mobile devices 130, 135, 136, and 140 include devices equipped for cellular communication through PLMN 120, devices equipped for Wi-Fi communications via wireless access points 125*a* or 125*b*, or dual-mode devices capable of both cellular and WLAN communications. Mobile devices 130, 135, 136, and 140 are described in detail below in FIG. 2.

Mobile devices 130, 135, 136, and 140 also include one or more radio transceivers and associated processing hardware and software to enable wireless communications with PLMN 120, and/or one of the WLANs via wireless access points 125*a* or 125*b*. In various embodiments, PLMN 120 and mobile devices 130, 135, 136, and 140 are configured to operate in compliance with any one or more of a number of wireless protocols, including GSM, GPRS, CDMA, EDGE, UMTS, EvDO, HSPA, 3GPP, or a variety of others. It will be appreciated that mobile devices 130, 135, 136, and 140 can roam within PLMN 120 and across PLMNs, in known manner, as their user moves. In some instances, dual-mode mobile devices 130, 135, 136, and 140 and/or enterprise network 105 are configured to facilitate roaming between PLMN 120 and a wireless access points 125*a* or 125*b*, and are thus capable of seamlessly transferring sessions (such as voice calls) from a connection with the cellular interface of dual-mode device (i.e., 130, 135, 136, and 140) to a WLAN interface of the dual-mode device, and vice versa.

Each mobile device possesses the ability to act as a mobile bridge. For example, mobile device 130 can act as a mobile bridge with mobile device 136. Generally, a conference call hosted using a mobile bridge will have a maximum of 3 participants. User controls at the mobile-bridge level include adding additional participants, muting the device user, un-muting the device user, and exiting the conference call. Additionally, the moderator can have additional controls not available to other conference users. For example, muting a particular conference participant. The particular user and moderator controls associated with the mobile bridge can vary depending on the type of mobile bridge used. Additionally, the particular user and moderator controls available can vary depending on whether the conference is an audio conference, a video conference, or a combination thereof.

Enterprise network 105 typically includes a number of networked servers, computers, and other devices. For example, enterprise network 105 can connect one or more desktop or laptop computers 143 (one shown). The connection can be wired or wireless in some embodiments. Enterprise network 105 can also connect to one or more digital telephone phones 160.

Relay 125 serves to route messages received over PLMN 120 from mobile device 130 to corresponding enterprise network 105. Relay 125 also pushes messages from enterprise network 105 to mobile device 130 via PLMN 120.

Enterprise network 105 also includes an enterprise server 150. Together with relay 125, enterprise server 150 functions to redirect or relay incoming e-mail messages addressed to a user's e-mail address through enterprise network 105 to mobile device 130 and to relay incoming e-mail messages composed and sent via mobile device 130 out to the intended recipients within WAN 115 or elsewhere. Enterprise server 150 and relay 125 together facilitate a "push" e-mail service for mobile device 130, enabling the user to send and receive e-mail messages using mobile device 130 as though the user were coupled to an e-mail client within enterprise network 105 using the user's enterprise-related e-mail address, for example on computer 143.

As is typical in many enterprises, enterprise network 105 includes a Private Branch eXchange (although in various embodiments the PBX can be a standard PBX or an IP-PBX, for simplicity the description below uses the term PBX to refer to both) 127 having a connection with PSTN 128 for routing incoming and outgoing voice calls for the enterprise. PBX 127 is coupled to PSTN 128 via DID trunks or PRI trunks, for example. PBX 127 can use ISDN signaling protocols for setting up and tearing down circuit-switched connections through PSTN 128 and related signaling and communications. In some embodiments, PBX 127 can be coupled to one or more conventional analog telephones 129. PBX 127 is also coupled to enterprise network 105 and, through it, to telephone terminal devices, such as digital telephone sets 160, softphones operating on computers 143, etc. Within the enterprise, each individual can have an associated extension number, sometimes referred to as a PNP (private numbering plan), or direct dial phone number. Calls outgoing from PBX 127 to PSTN 128 or incoming from PSTN 128 to PBX 127 are typically circuit-switched calls. Within the enterprise, for example, between PBX 127 and terminal devices, voice calls are often packet-switched calls, for example Voice-over-LP (VoIP) calls.

PBX 127 possesses an intermediate conferencing server capability, and generally can host a conference call with a predetermined maximum number of participants, for example 3 to 7 participants. PBX 127 is configured to allow the moderator to possess one or more moderator controls. For example, typical user controls at the intermediate conference server level include joining a conference call, muting the user, recording the conference call, application sharing, and un-muting the user. Additionally, the moderator can have additional controls not available to the conference participants. For example, muting a participant, un-muting a participant, and dropping one or more participants. The particular user and moderator controls associated with the intermediate conference server can vary depending on the type intermediate conference server used. Additionally, the particular user and moderator controls available can vary depending on whether the conference is an audio conference, a video conference, or a combination thereof.

System 100 includes one or more conference bridges 132. Conference bridge 132 can be part of enterprise network 105. Additionally, in some embodiments, conference bridge 132 can be accessed via WAN 115 or PTSN 128.

Conference bridge 132 generally is configured to host conference calls with a maximum number of participants numbering in the 100 s or more (for example, 1000). Conference bridge 132 is configured such that the user possesses a plurality of controls. Conference bridge 132 user controls can include joining a conference call, muting the user, exiting the conference call, creating side conferences, application sharing, etc. Additionally, the moderator can have additional controls that are not available to other participants of the conference. For example, muting one or more participants, speaking priority (i.e. when moderator speaks all participants are muted), dropping one or more participants, recording the transcript of the conference call, etc. Conferences hosted using conference bridge 132 typically have a larger maximum number of participants and a larger number of moderator controls. The particular user and moderator controls associated with the conference bridge can vary depending on the type conference bridge used. Additionally, the particular user and moderator controls available can vary depending on whether the conference is an audio conference, a video conference, or a combination thereof.

Enterprise network 105 can further include a Service Management Platform (SMP) 165 for performing some aspects of messaging or session control, like call control and advanced call processing features. Service Management Platform (SMP) can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers. SMP 165 is configured to connect different conference systems to create a heterogeneous conference, for example, a single teleconference, where participants can be joined to the conference via a mobile bridge and an intermediate conference server.

Device control system 400 can include one or more processors (not shown), a memory (not shown), and a data interface (not shown). The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers. Device control system 400 can be implemented on a mobile device, a single computer, distributed across a plurality of computers, or some combination thereof.

Figure 2:
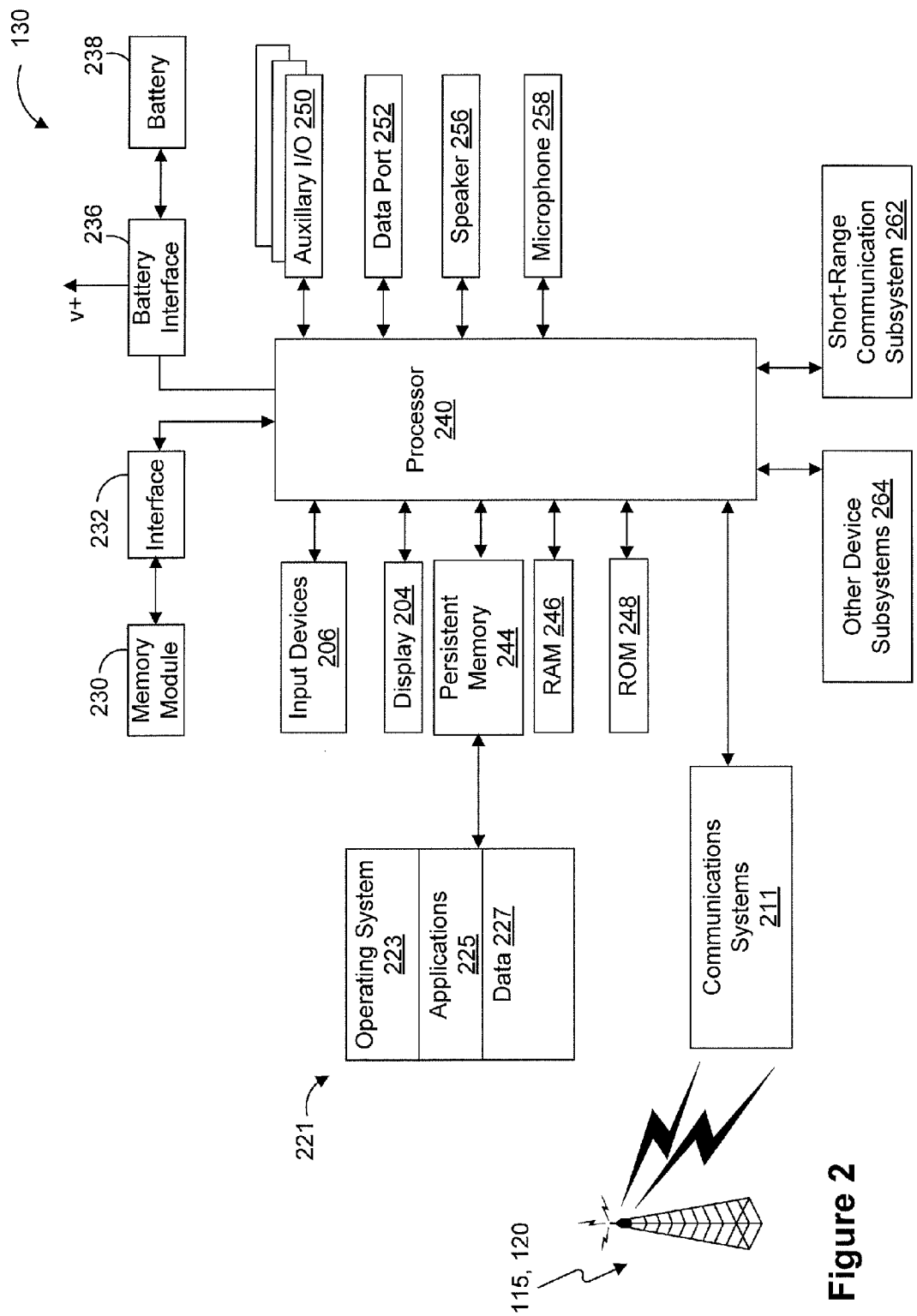
FIG. 2 shows a block diagram illustrating a mobile communication device in accordance with an example embodiment.

Reference is now made to FIG. 2 which illustrates in detail mobile device 130 in which example embodiments can be applied. Note that while FIG. 2 is described in reference to mobile device 130, it also applies to mobile devices 135, 136, and 140. Mobile device 130 is a two-way communication device having data and voice communication capabilities, and the capability to communicate with other computer systems, for example, via the Internet. Depending on the functionality provided by mobile device 130, in various embodiments mobile device 130 can be a handheld device, a multiple-mode communication device configured for both data and voice communication, a smartphone, a mobile telephone, a tablet, or a PDA (personal digital assistant) enabled for wireless communication.

Mobile device 130 includes a rigid case (not shown) housing the components of mobile device 130. The internal components of mobile device 130 can, for example, be constructed on a printed circuit board (PCB). The description of mobile device 130 herein mentions a number of specific components and subsystems. Although these components and subsystems can be realized as discrete elements, the functions of the components and subsystems can also be realized by integrating, combining, or packaging one or more elements in any suitable fashion.

Mobile device 130 includes a controller comprising at least one processor 240 (such as a microprocessor), which controls the overall operation of mobile device 130. Processor 240 interacts with device subsystems such as a communication systems 211 for exchanging radio frequency signals with the wireless network (for example WAN 115 and/or PLMN 120) to perform communication functions. Processor 240 interacts with additional device subsystems including a display 204 such as a liquid crystal display (LCD) screen or any other appropriate display, input devices 206 such as a keyboard and control buttons, persistent memory 244, random access memory (RAM) 246, read only memory (ROM) 248, auxiliary input/output (I/O) subsystems 250, data port 252 such as a conventional serial data port or a Universal Serial Bus (USB) data port, speaker 256, microphone 258, short-range communication subsystem 262 (which can employ any appropriate wireless (for example, RF), optical, or other short range communications technology), and other device subsystems generally designated as 264. Some of the subsystems shown in FIG. 2 perform communication-related functions, whereas other subsystems can provide "resident" or on-device functions.

Display 204 can be realized as a touch-screen display in some embodiments. The touch-screen display can be constructed using a touch-sensitive input surface coupled to an electronic controller and which overlays the visible element of display 204. The touch-sensitive overlay and the electronic controller provide a touch-sensitive input device and processor 240 interacts with the touch-sensitive overlay via the electronic controller.

Communication systems 211 includes one or more communication systems for communicating with wireless WAN 115 and wireless access points 125a and 125b within the wireless network. The particular design of communication systems 211 depends on the wireless network in which mobile device 130 is intended to operate. Mobile device 130 can send and receive communication signals over the wireless network after the required network registration or activation procedures have been completed.

Processor 240 operates under stored program control and executes software modules 221 stored in memory such as persistent memory 244 or ROM 248. Processor 240 can execute code means or instructions. ROM 248 can contain data, program instructions or both. Persistent memory 244 can contain data, program instructions, or both. In some embodiments, persistent memory 244 is rewritable under control of processor 240, and can be realized using any appropriate persistent memory technology, including EEPROM, EAROM, FLASH, and the like. As illustrated in FIG. 2, software modules 221 can include operating system software 223. Additionally, software modules 221 can include software applications 225.

In some embodiments, persistent memory 244 stores user-profile information, including, one or more conference dial-in telephone numbers. Persistent memory 244 can additionally store identifiers related to particular conferences. Persistent memory 244 can also store information relating to various people, for example, name of a user, a user's identifier (user name, email address, or any other identifier), place of employment, work phone number, home address, etc. Persistent memory can additionally store command translation programs. A command translation program is able to convert a generic command into a command (native command) recognized by different types of conference hosting systems. Persistent memory 244 can also store a conference map. In some embodiments, persistent memory 244 also stores a conference map. A conference map includes information pertaining to how the conference participants are joined to a particular conference. For example, a conference map would indicate that participant A is joined to the conference via a PBX and participant B is joined to the conference via a conference bridge.

Software modules 221, for example, device control system 400, or parts thereof can be temporarily loaded into volatile memory such as RAM 246. RAM 246 is used for storing runtime data variables and other types of data or information. In some embodiments, different assignment of functions to the types of memory could also be used.

Software applications 225 can further include a range of applications, including, for example, an application related to a device control system, an e-mail messaging application, address book, calendar application, notepad application, Internet browser application, voice communication (i.e., telephony) application, mapping application, or a media player application, or any combination thereof. Each of software applications 225 can include layout information defining the placement of particular fields and graphic elements (for example, text fields, input fields, icons, etc.) in the user interface (i.e., display 204) according to the application.

In some embodiments, auxiliary input/output (I/O) subsystems 250 comprise an external communication link or interface, for example, an Ethernet connection. In some embodiments, auxiliary I/O subsystems 250 can further comprise one or more input devices, including a pointing or navigational tool such as a clickable trackball or scroll wheel or thumbwheel, or one or more output devices, including a mechanical transducer such as a vibrator for providing vibratory notifications in response to various events on mobile device 130 (for example, receipt of an electronic message or incoming phone call), or for other purposes such as haptic feedback (touch feedback).

In some embodiments, mobile device 130 also includes one or more removable memory modules 230 (typically comprising FLASH memory) and one or more memory module interfaces 232. Among possible functions of removable memory module 230 is to store information to augment interoperability between device control system 400 and different types of conference hosting systems. For example, memory modules 230 can contain one or more command translation programs. Another possible function of removable memory module 230 is to store information used to identify or authenticate a user or the user's account to wireless network (for example WAN 115 and/or PLMN 120). For example, in conjunction with certain types of wireless networks, including GSM and successor networks, removable memory module 230 is referred to as a Subscriber Identity Module or SIM. Memory module 230 is inserted in or coupled to memory module interface 232 of mobile device 130 in order to operate in conjunction with the wireless network.

Mobile device 130 stores data 227 in persistent memory 244. In various embodiments, data 227 includes service data comprising information required by mobile device 130 to establish and maintain communication with the wireless network (for example WAN 115 and/or PLMN 120). Data 227 can also include, for example, scheduling and connection information for connecting to a scheduled call. Data 227 can include device control system data used by mobile device 130 for various tasks in both homogenous and heterogeneous conferences. For example, to add participants in a conference call, to provide moderator control over a conference call to mobile device 130 when mobile device 130 acts as a moderator device, to provide one or more controls to a user of mobile device 130 when participating in a conference call, etc.

Mobile device 130 also includes a battery 238 which furnishes energy for operating mobile device 130. Battery 238 can be coupled to the electrical circuitry of mobile device 130 through a battery interface 236, which can manage such functions as charging battery 238 from an external power source (not shown) and the distribution of energy to various loads within or coupled to mobile device 130. Short-range communication subsystem 262 is an additional optional component which provides for communication between mobile device 130 and different systems or devices, which need not necessarily be similar devices. For example, short-range communication subsystem 262 can include an infrared device and associated circuits and components, or a wireless bus protocol compliant communication mechanism such as a BLUETOOTH communication module to provide for communication with similarly-enabled systems and devices.

A predetermined set of applications that control basic device operations, including data and possibly voice communication applications can be installed on mobile device 130 during or after manufacture. Additional applications and/or upgrades to operating system software 223 or software applications 225 can also be loaded onto mobile device 130 through the wireless network (for example WAN 115 and/or PLMN 120), auxiliary I/O subsystem 250, data port 252, short-range communication subsystem 262, or other suitable subsystem such as 264. The downloaded programs or code modules can be permanently installed, for example, written into the program memory (for example persistent memory 244), or written into and executed from RAM 246 for execution by processor 240 at runtime.

Mobile device 130 can provide three principal modes of communication: a data communication mode, a voice communication mode, and a video communication mode. In the data communication mode, a received data signal such as a text message, an e-mail message, Web page download, or an image file are processed by communication systems 211 and input to processor 240 for further processing. For example, a downloaded Web page can be further processed by a browser application, or an e-mail message can be processed by an e-mail message messaging application and output to display 204. A user of mobile device 130 can also compose data items, such as e-mail messages, for example, using the input devices in conjunction with display 204. These composed items can be transmitted through communication systems 211 over the wireless network (for example WAN 115 and/or PLMN 120). In the voice communication mode, mobile device 130 provides telephony functions and operates as a typical cellular phone. In the video communication mode, mobile device 130 provides video telephony functions and operates as a video teleconference term. In the video communication mode, mobile device 130 utilizes one or more cameras (not shown) to capture video of video teleconference. Additionally, in some embodiments, mobile device 130 utilizes the one or more cameras to capture video. The video can be stored as one or more video data files in persistent memory 244, RAM 248, memory module 230, or any other data storage medium.

Figure 3C:
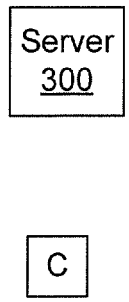
FIG. 3C shows an example heterogeneous conference call with a mobile bridge, an intermediate conference server, and a conference server.
Figure 3C:
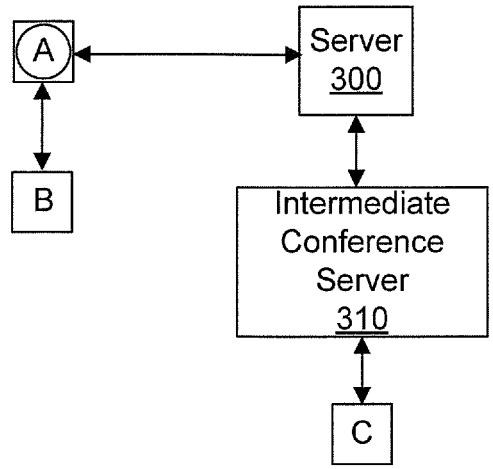
Figure 3C:
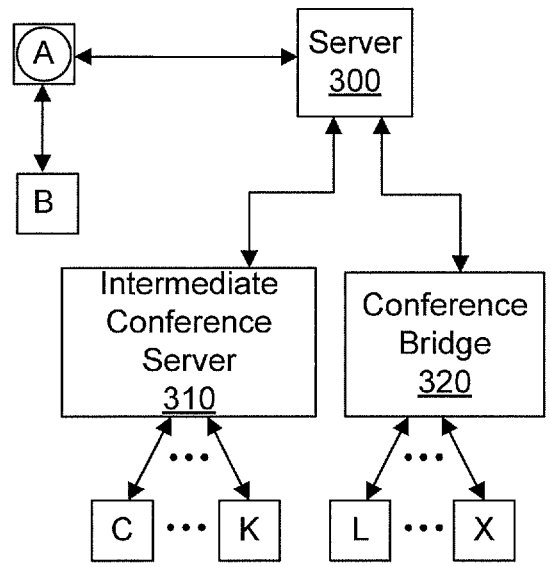

FIG. 3A illustrates an example call (audio or video) between participant A on a mobile device and participant B using a mobile bridge. The mobile device used by the moderator of the conference is referred to as the moderator device. In FIG. 3A, the moderator of the conference is participant A. If a conference participant decides to add participant C, the moderator device (for example, mobile device 130) automatically communicates with a server 300 (for example, SMP 165) to join participant C using an additional conference hosting system. In some embodiments, any mobile device can add additional participants. In other embodiments, only the moderator device can add additional participants. FIG. 3B illustrates a heterogeneous conference utilizing a mobile bridge connection between participant A and participant B and server 300 (for example, SMP 165), and a connection with participant C via an intermediate conference server 310 (for example PBX 127). Additional participants can then be added until the conference hosting systems have reached some maximum number of participants. This maximum value can be determined automatically by the device control system located on the mobile device of participant A. Or in some embodiments, the maximum value is automatically determined by server 300 or by one of the conferencing hosting systems included within the heterogeneous conferences, or some combination thereof. Additionally, in some embodiments the moderator can set the maximum participant value to a value one or more below the actual maximum of the heterogeneous conference. Once the maximum participant value occurs server 300 is configured to automatically conference in an additional conference resource, for example, a conference bridge 320 (can correspond to conference bridge 132), thus creating an expanded heterogeneous conference. In some embodiments not shown, the device control system 400 is configured to automatically conference in an additional conference resource without using server 300. FIG. 3C illustrates a heterogeneous conference utilizing a mobile bridge, server 300, intermediate conference server 310, and conference bridge 320.

Server 300 is configured to communicate with participant devices to ensure control interoperability between and among the different conference hosting systems. After a participant device receives a control from the user, device control system provides an associated one or more generic commands to server 300, using for example, application programming interface (API) calls, BOSS, dual tone multi-frequency (DTMF) digits, or other protocols. Server 300 is configured to receive the generic commands from one or more mobile devices participating in the conference and translate them to the native commands recognized by one or more conference hosting systems. The native commands could be expressed for example, as CLI commands, text commands to a port, XML-encoded commands or requests to a web service like SOAP, etc. In some embodiments, the translation into native commands occurs on the participant device.

Referring back to FIG. 1, collectively SMP 165, conference bridge 132, and PBX 127 is referred to as the enterprise communications platform, generally designated 180. It will be appreciated that enterprise communications platform 180 and, in particular, SMP 165, is implemented on one or more servers having suitable communications interfaces for connecting to and communicating with PBX 127, conference bridge 132 and DID/PRI trunks. Although SMP 165 can be implemented on a stand-alone server, it will be appreciated that it can be implemented into an existing control agent/server as a logical software component.

Mobile device 130 has a device control system 400 and is in communication with enterprise network 105. In some example embodiments, device control system 400 also operates on mobile devices 135, 136, and 140, computers 142 and 143, digital phone 160, or any variation thereof. In some embodiments, device control system 400 is in communication with and operates as part of a conference call program installed on mobile devices 130, 135, 136, and 140, and other servers on enterprise network 105, for example, SMP 165. Additionally, in some embodiments, device control system 400 is integral to the conference call program.

Figure 4:
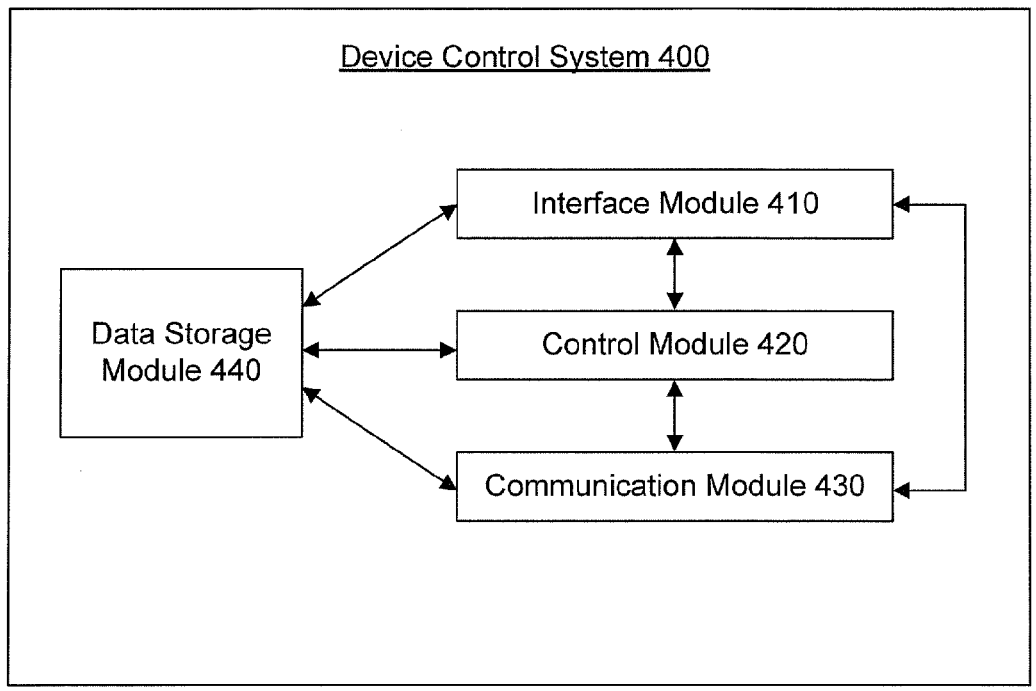
FIG. 4 is a block diagram depicting example device control system for managing user controls in a conference.

FIG. 4 is a block diagram depicting example device control system 400. As illustrated, device control system 400 includes an interface module 410, a control module 420, a communication module 430, and a data storage module 440. It is appreciated that one or more of these modules can be deleted, modified, or combined together with other modules.

Figures 5A, 5B:
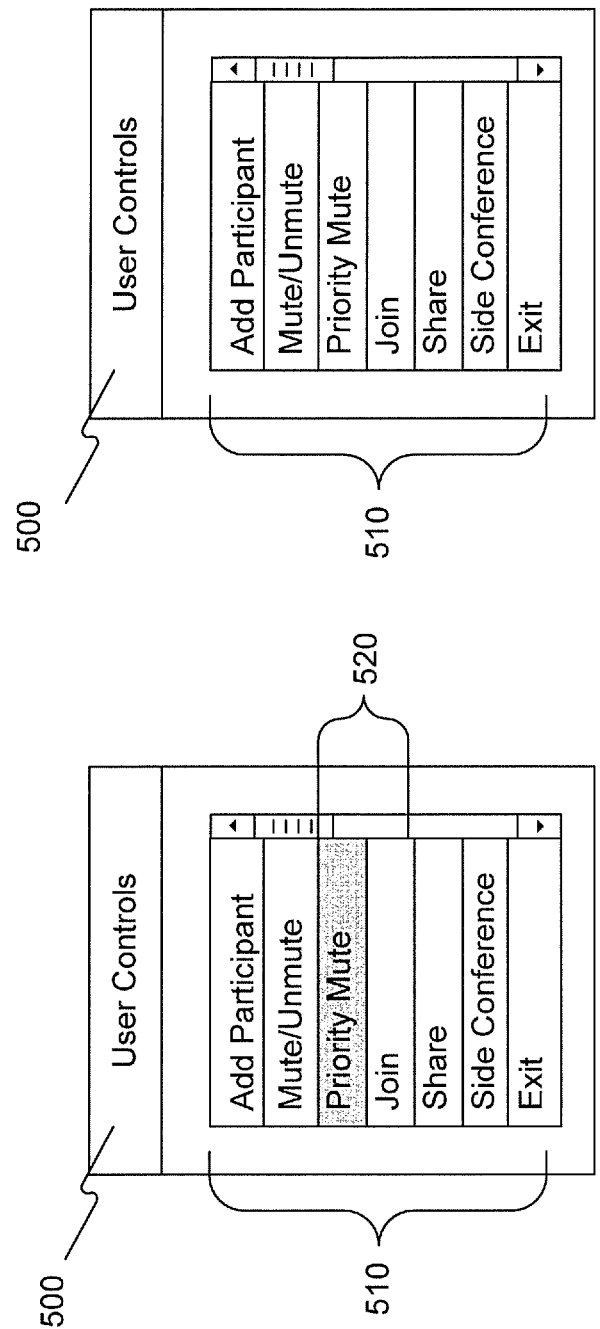
FIG. 5A illustrates an example user controls graphical user interface on a moderator device.
FIG. 5B illustrates an example user controls graphical user interface on a non-moderator device.

Interface module 410 displays the user controls and enables selection of controls available to the user of the mobile device. FIG. 5A illustrates an example user controls graphical user interface (GUI) 500 generated by interface module 410, displaying controls 510 available on a user device. Controls 510 can include one or more controls, for example add participant, mute/unmute, priority mute, join a participant, share, side conference, and exit. The above listing of controls is not inclusive, and can include other controls not listed. Additionally, the particular user controls available can vary depending on whether the conference is an audio conference, a video conference, or a combination thereof.

The add participant control allows the user to add an additional participant. The add participant control acquires a list of potential participants from a contact list associated with the user. The contact list can be stored in data storage module 440. User controls GUI 500 can display the potential list of participants to the user. In a heterogeneous conference, after the user designates which participant is to be added, mobile device 130 communicates with a server (for example, SMP 165) to add the selected participant via one of the conference hosting systems included in the heterogeneous conference. The method of adding the additional participant is discussed below with reference to FIG. 7. The mute control mutes the user of the mobile device with respect to the rest of the conference. The priority mute control mutes all the participants when the user speaks. The join control allows the user to join one or more other conferences as a participant of those conferences. The share control causes device control system to automatically launch a shared application (for example, a presentation) among the participating mobile devices without each conference participant having to individually execute the application. The side conference command allows the user to enter into a separate conference with one or more participants of the existing conference. The exit conference control allows the user to leave the conference. The above listing of controls is not inclusive, and can include other controls not listed.

In this embodiment, controls 510 also displays one or more moderator controls 520 which are unavailable to the user. For example in this embodiment priority mute is unavailable to the user because the user is not the moderator, and is grayed out. In some embodiments not shown, controls 510 only displays controls that are available to the user.

FIG. 5B illustrates an example user controls graphical user interface (GUI) 500 generated by interface module 410, displaying controls 510 available on a moderator device. A moderator device is associated with the moderator of the conference. Controls 510 can include one or more controls, for example add participant, mute/unmute, priority mute, join a participant, share, side conference, and exit. The above listing of controls is not inclusive, and can include other controls not listed. Additionally, the particular user and moderator controls available can vary depending on whether the conference is an audio conference, a video conference, or a combination thereof. In some embodiments, when the exit control is executed, the device control system can prompt the moderator to transfer moderator control to another conference participant before leaving the heterogeneous conference.

Referring back to FIG. 4, after a particular control is selected, device control system 400 automatically generates an associated generic command via control module 420. In some embodiments, the selection of a control can cause device control system 400 to automatically generate a plurality of generic commands. Additionally, in some embodiments, device control system can automatically generate one or more generic commands independent of the user's selection of controls. For example, device control system can be configured to automatically attempt to join additional participants after the first attempt fails.

Control module 420 is configured to track what user controls are available to the user of the mobile device. After a control is asserted in relation to a participant coupled to the conference via a particular conference hosting system, control module 420 communicates with a server (for example, server 300) via communication module 430 to execute the selected control. For example, if the moderator exercises a mute control over a participant, control module 420 would transmit this control to the server (in the form of a generic command), which would then re-transmit the mute control to the particular conference hosting system (in the form of a native command) which then mutes the participant.

In some embodiments control module 420 converts a received control from a mobile device participating in the conference into a generic command (or in some cases a plurality of generic commands). Additionally, the generic command can be automatically generated by the device control system (for example, automatic redial), using for example, API calls, BOSS, DTMF digits, or other protocols. The listing of controls is not inclusive, and can include other controls not listed. The control module 420 is configured to send the generic command to a server that translates the generic commands into one or more native commands recognized by one or more conference hosting systems. The server is configured to communicate with participant devices and conference hosting systems In some embodiments, control module 420 translates the generic commands into one or more native commands recognized by one or more conference hosting systems. In this embodiment, the translation into native commands occurs on the participant device. The native commands could be expressed for example, as CLI commands, text commands to a port, XML-encoded commands or requests to a web service like SOAP, etc. Control module 420 identifies the conference hosting system to receive the command using a conference map stored in data storage module 440. Control module 420 then translates the generic commands into one or more native commands using one or more command translation programs stored in data storage module 440.

In a heterogeneous conference, the format of the controls can be different depending on how the participant is coupled to the conference. For example, referring to FIG. 3C, a mute control to be exercised over participant C is formatted such that it is recognized by intermediate conference server 310. Whereas, the same mute control, sent to participant L coupled to the heterogeneous conference via conference bridge 320, can require a different format for conference bridge 320 to recognize the control. In some embodiments, server 300 receives generic commands from the user device and automatically formats them to conform with the native commands of the conference hosting systems coupled to the heterogeneous conference (for example via control module 420). In some embodiments, device control system 400 places the controls in the appropriate format before sending them to the server, which then relays the controls to the appropriate conference hosting system. Additionally, in some embodiments the mobile device directly sends the properly formatted controls (via control module 420) to the conference hosting systems that make up the heterogeneous conference. Additionally, in some embodiments, device control system can format the commands on the mobile device and send generic commands to the server for formatting commands. For example, the mobile device can be configured to format commands that are common, or require minimal processing, etc., and otherwise send generic commands to the server for proper formatting. Control module 420 can be coupled to interface module 410, communication module 430, and data storage module 440.

Communication module 430 is configured to transmit generic commands, via enterprise network 105, PLMN 120, WAN 115, or some combination thereof, to server 300 (for example, SMP 165). Additionally, in some embodiments communication module 430 directly sends native commands to the conference hosting systems which make up the heterogeneous conference. In some embodiments, communication module 430 can store a record of the communications sent and received in data storage module 440. Communication module 430 can be coupled to interface module 410, control module 420, and data storage module 440.

Data storage module 440 can also include a database, one or more computer files in a directory structure, or any other appropriate data storage mechanism such as a memory. Data storage module 440 can store one or more generic commands recognizable by device control system 400. Data storage module 440 can also store one or more conference maps, and one or more command translation programs. A conference map includes information pertaining to how the conference participants are joined to a particular conference. A command translation program can be used by device control system 400 to translate a generic command into a native command of one or more types of conference hosting systems. Additionally, in some embodiments, data storage module 440 stores user profile information, including, one or more conference dial in telephone numbers. Data storage module 440 can also store identifiers associated with particular conferences. Data storage module 440 also stores information relating to various people, for example, name, place of employment, work phone number, home address, etc. In some example embodiments, data storage module 440 is distributed across a one or more network servers. Data storage module 440 can communicate with interface module 410, control module 420, and communication module 430.

Each of modules 410, 420, 430, and 440 can be software programs stored in a RAM, a ROM, a PROM, a FPROM, or other dynamic storage devices, or persistent memory for storing information and instructions.

Figure 6:
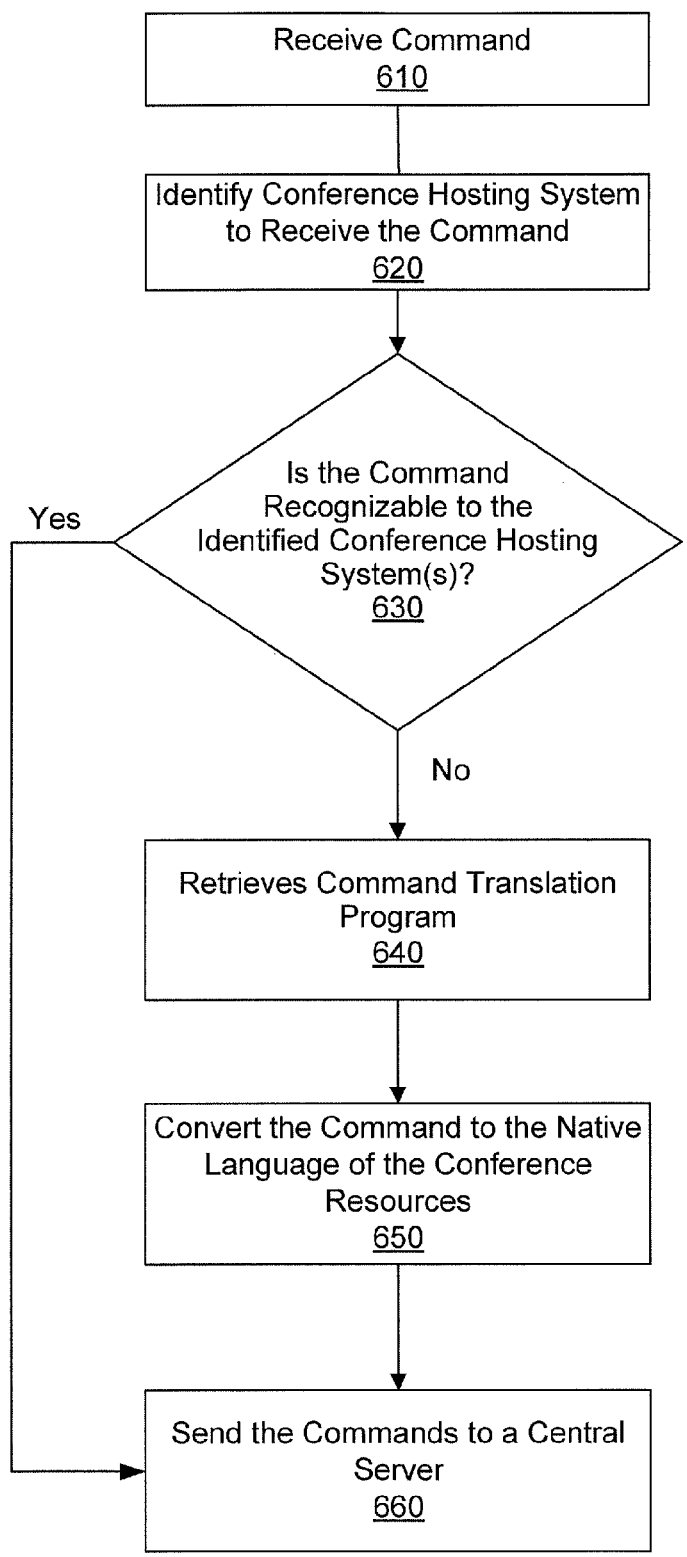
FIG. 6 shows a flowchart representing an example method performed on a mobile device for automating user control in a heterogeneous conference.

FIG. 6 is a flowchart representing an example method performed on a mobile device for automating user controls in a conference. The conference includes a plurality of participants, and the participants are coupled to the conference via one or more mobile devices. Additionally, the conference can be hosted on one or more conference hosting devices. Moreover, the conference can be a heterogeneous or a homogenous conference. While the flowchart discloses the following steps in a particular order, it is appreciated that at least some of the steps can be moved, modified, or deleted where appropriate.

In step 610, a device control system receives a generic command (for example, API calls, BOSS, DTMF digits, or other protocols) from a mobile device participating in the conference. The generic command can be generated in response to an input control by the user of the mobile device. Additionally, the generic command can be automatically generated by the device control system (for example, automatic redial). The control associated with the generic command can be, for example, add participant, mute/unmute, priority mute, join a participant, share, side conference, and exit. Additionally, the particular user and moderator controls available can vary depending on whether the conference is an audio conference, a video conference, or a combination thereof. The listing of controls is not inclusive, and can include other controls not listed.

In step 620, the device control system automatically identifies which of the one or more conference hosting systems, and in particular their associated mobile devices, are to receive the command. The device control system references a conference map stored in memory to identify one or more destinations for the command corresponding to the appropriate conference hosting system. For example, if participant A provides a command to create a side conference between participant A and participant B, the device control system references the conference map to identify how participant B is coupled to the conference. For example, participant B could be coupled via a PBX that operates using a particular computer language. In some embodiments, a plurality of conference hosting systems are identified as destinations for the command. For example, if a moderator were to select priority mute, each conference hosting system would have to receive and execute the command.

In step 630, the device control system automatically determines whether the generic command is recognizable to the identified one or more conference hosting systems. For example, the destination conference hosting system can be configured to recognize generic commands. If the device control system determines that the generic command is recognizable to the one or more identified conference hosting systems, it sends the command (step 660), otherwise the device control system proceeds to step 640.

In step 640, the device control system automatically retrieves one or more command translation programs. The command translation programs can be used to convert the generic command into one or more native commands of the one or more conference hosting systems. The native commands can be expressed as, for example, CLI commands, text commands to a port, XML-encoded commands, or requests to a web service like SOAP, etc. The device control system references an associated memory to identify the correct command translation programs to convert the generic commands to the native commands of the conference hosting system.

In some embodiments not shown, if the appropriate command translation program is not found in the associated memory, the device control system is configured to access resources located on a server to download the appropriate command translation program. Additionally, device control system can be configured to forward the command in a generic format to a server and the server can convert the generic command into the native command of the conference hosting system and send the command to the conference hosting system. This is further explained in FIG. 7 below.

In step 650, the device control system translates the generic command into one or more native commands recognized by the one or more conference hosting systems. The device control system translates the generic commands using one or more command translation programs that translate the generic command into the one or more native commands recognized by the one or more conference hosting systems.

Additionally, in cases where the converted command travels between many intermediate systems that do not recognize the native command, the device control system can encapsulate the native command to ensure that it reaches the appropriate one or more conference-hosting systems. For example, the device control system can encapsulate the native command in one or more layers where each layer is correctly formatted to be recognizable to the intermediate systems between the mobile device and the command's destination. As the encapsulated command is routed through the intermediate systems, each intermediate system can be configured to remove the layer associated with it such that the encapsulated command is in a form recognizable by the receiving system or device.

In step 660, the device control system sends the command. The command can be sent to a server (for example, SMP 165) which then distributes the command to the identified one or more conference hosting systems (for example, PBX 128, conference bridge 132, etc.). The identified one or more conference hosting systems can, for example, transmit the command to one or more associated mobile devices, automatically execute the command, or some combination thereof.

Figure 7:
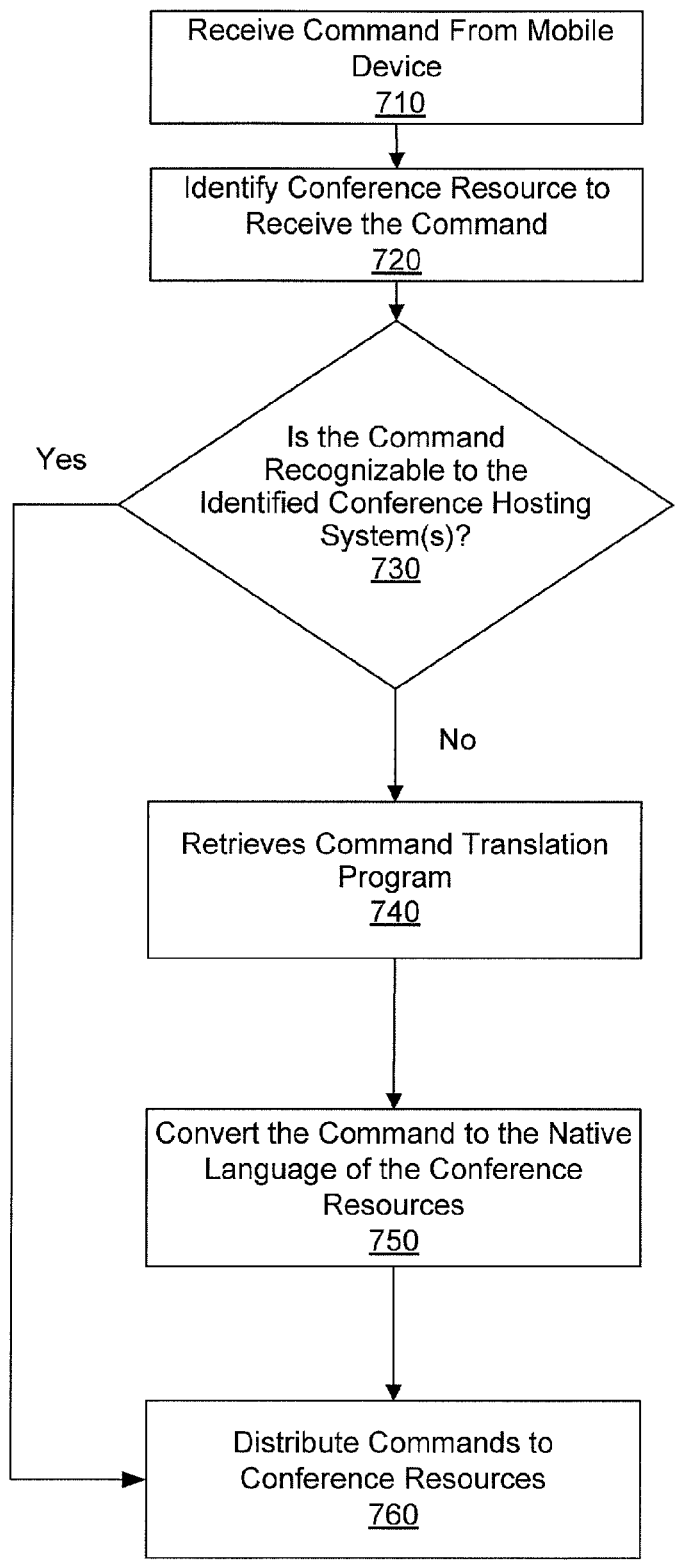
FIG. 7 shows a flowchart representing an example method performed on a server for facilitating user control in a heterogeneous conference.

FIG. 7 is a flowchart representing an example method performed on a server (for example SMP 165) for facilitating user control in a heterogeneous conference. The conference includes a plurality of participants, and the participants are coupled to the conference via one or more mobile devices. Additionally, the conference can be hosted on one or more conference hosting devices. Moreover, the conference can be a heterogeneous or a homogenous conference. While the flowchart discloses the following steps in a particular order, it is appreciated that at least some of the steps can be moved, modified, or deleted where appropriate.

In step 710, the server system receives a generic command (for example, API calls, BOSS, DTMF digits, or other protocols) from a mobile device participating in the conference. The generic command can be generated in response to an input control by the user of the mobile device. Additionally, the generic command can automatically be generated by the device control system (for example, automatic redial). The control associated with the generic command can be, for example, add participant, mute/unmute, priority mute, join a participant, share, side conference, and exit. Additionally, the particular user and moderator controls available can vary depending on whether the conference is an audio conference, a video conference, or a combination thereof. The listing of controls is not inclusive, and can include other controls not listed.

In step 720, device control system automatically identifies which of the one or more conference hosting systems are to receive the command. Device control system references a conference map stored in an associated memory to identify the destination for the command. For example, if participant A provides a command to create a side conference between participant A and participant B, the device control system references the conference map to identify how participant B is coupled to the conference. For example, participant B could be coupled via a PBX that operates using a particular computer language. In some embodiments, a plurality of conference hosting systems are identified as destinations for the command. For example, if the generic command corresponded to a priority mute, each conference hosting system would have to receive and execute the command.

In step 730, the device control system automatically determines whether the generic command is recognizable to the identified one or more conference hosting systems. For example, the destination conference hosting system can be configured to recognize generic commands. If the device control system deter mines that the generic command is recognizable to the one or more conference hosting systems, it sends the command (step 760); otherwise the device control system proceeds to step 740.

In step 740, the device control system automatically retrieves one or more command translation programs. The command translation programs can be used to convert the generic command into one or more native commands of the one or more conference hosting systems. The native commands can be expressed as, for example, CLI commands, text commands to a port, XML-encoded commands, or requests to a web service like SOAP, etc. The device control system references an associated memory to identify the correct command translation programs to convert the generic commands to native commands of the conference hosting system.

In some embodiments not shown, if the appropriate command translation program is not found in the associated memory, the device control system is configured to access resources located on a web server to download the appropriate command translation program.

In step 750, the device control system converts the command into one or more native commands recognized by the identified conference hosting system. The device control system translates the generic commands using one or more command translation programs that translate the generic command into the one or more native commands recognized by the one or more conference hosting systems.

Additionally, in cases where the one or more native command travel between many intermediate systems that do not recognize the one or more native commands, the device control system can encapsulate the one or more native commands to ensure that they reach the appropriate one or more conference hosting systems. For example, the device control system can encapsulate the one or more native commands in one or more layers where each layer is correctly formatted to be recognizable to the intermediate systems between the mobile device and the command's destination. As the encapsulated command is routed through the intermediate systems, each intermediate system can be configured to remove the layer associated with it such that the encapsulated command is in a form recognizable by the receiving system.

In step 760, the device control system sends the one or more native commands to the one or more conference hosting systems. The receiving one or more conference hosting systems can for example, transmit the one or more commands to one or more associated mobile devices, automatically execute the command, or some combination thereof.

Certain adaptations and modifications of the described embodiments can be made. Therefore, the above discussed embodiments are considered to be illustrative and not restrictive.

Embodiments of the present application are not limited to any particular operating system, mobile device architecture, server architecture, or computer programming language.

What is claimed is:

1. A method comprising:
   receiving one or more generic commands when coupled to a heterogeneous conference call, the conference call including a plurality of participants coupled to the conference call using one or more mobile devices;
   automatically translating, by a control module the one or more generic commands into one or more native commands recognized by a first conference hosting system, of the plurality of conference hosting systems; and
   automatically sending the one or more native commands to the first conference hosting system.

2. The method of claim 1, wherein the types of conference hosting systems are selected from the group consisting of a mobile bridge, an intermediate conference server, and a conference bridge.

3. The method of claim 1, wherein the one or more generic commands are received from a mobile device coupled to the heterogeneous conference call.

4. The method of claim 1, wherein automatically translating occurs on a mobile device coupled to the heterogeneous conference call.

5. The method of claim 4, further comprising:
   receiving a control selected by a user via a user interface; and
   automatically associating the control with the one or more generic commands.

6. The method of claim 1, further comprising:
   identifying the first conference hosting system using a conference map.

7. The method of claim 1, further comprising:
   retrieving one or more command translation programs from an associated memory, wherein automatically translating the one or more generic commands into the one or more native commands uses the one or more command translation programs.

8. The method of claim 1, wherein the generic command is associated with a request to add a participant to the heterogeneous conference;
   the method further comprising:
      determining if a participant limit has been reached for the heterogeneous conference,
      connecting with an additional conference hosting system using the one or more native commands, if the participant limit is reached, to create an expanded heterogeneous conference, and
      adding the participant to the expanded heterogeneous conference via the additional conference hosting system.

9. A non-transitory computer-readable medium comprising program code, the program code being operable, when executed by a computer system, to cause the system to perform a method, the method comprising:
   receiving one or more generic commands when coupled to a heterogeneous conference call, the conference call including a plurality of participants coupled to the conference call using one or more mobile devices;
   automatically translating, by a control module the one or more generic commands into one or more native commands recognized by a first conference hosting system, of the plurality of conference hosting systems; and
   automatically sending the one or more native commands to the first conference hosting system.

10. The non-transitory computer readable medium of claim 9, wherein the types of conference hosting systems are selected from the group consisting of a mobile bridge, an intermediate conference server, and a conference bridge.

11. The non-transitory computer readable medium of claim 9, wherein the one or more generic commands are received from a mobile device coupled to the heterogeneous conference call.

12. The non-transitory computer readable medium of claim 9, wherein automatically translating occurs on a mobile device coupled to the heterogeneous conference call.

13. The non-transitory computer readable medium of claim 12, further comprising:
   receiving a control selected by a user via a user interface; and
   automatically associating the control with the one or more generic commands.

14. The non-transitory computer readable medium of claim 9, further comprising:

identifying the first conference hosting system using in part a conference map.

15. The non-transitory computer readable medium of claim 9, further comprising:
retrieving one or more command translation programs from an associated memory, wherein automatically translating the one or more generic commands into the one or more native commands uses the one or more command translation programs.

16. The non-transitory computer readable medium of claim 9, wherein the one or more generic command are associated with a request to add a participant to the heterogeneous conference;
the method further comprising:
determining if a participant limit has been reached or the heterogeneous conference,
connecting with an additional conference hosting system using the or more native commands, if the participant limit is reached, to create an expanded heterogeneous conference, and
adding the participant to the expanded heterogeneous conference via the additional conference hosting system.

17. A mobile device comprising:
one or more processors configured to execute modules; and
a memory storing the modules, the modules comprising:
an interface module configured to receive one or more generic commands on a mobile device coupled to a heterogeneous conference call, the conference call including a plurality of participants coupled to the conference call using one or more mobile devices, wherein the mobile device is coupled to the conference call using a first conference hosting system, of a plurality of conference hosting systems,
a control module configured to automatically translate the one or more generic commands into one or more native commands recognized by a second conference hosting system, of the plurality of conference hosting systems, and
a communication module configured to automatically send the one or more native commands to a server which distributes the one or more native commands to the second conference hosting system.

18. The mobile device of claim 17, wherein the types of conference hosting systems are selected from the group consisting of a mobile bridge, an intermediate conference server, and a conference bridge.

19. The mobile device of claim 18, wherein the interface module is further configured to:
receive a control selected by a user via the user interface; and
automatically associate the control with the one or more generic commands.

20. The mobile device of claim 17 wherein the control module is further configured to identify the first conference hosting system using in part a conference map.

21. The mobile device of claim 17 wherein the control module is further configured to retrieve one or more command translation programs from an associated memory, wherein automatically translating the one or more generic commands into the one or more native commands uses the one or more command translation programs.

22. The mobile device of claim 17, wherein the one or more generic commands are associated with a request to add a participant to the heterogeneous conference;
the control module further configure to:
determine if a participant limit has been reached for the heterogeneous conference,
connect with an additional conference hosting system using the or more native commands, if the participant limit is reached, to create an expanded heterogeneous conference, and
add the participant o the expanded heterogeneous conference via the additional conference hosting system.

23. A server comprising:
one or more processors configured to execute modules; and
a memory storing the modules, the modules comprising:
an interface module configured to receive one or more generic commands from a mobile device coupled to a heterogeneous conference call, the conference call including a plurality of participants coupled to the conference call using one or more mobile devices, wherein the mobile device is coupled to the conference call using a first conference hosting system, of a plurality of conference hosting systems;
a control module configured to automatically translate the one or more generic commands into one or more native commands recognized by a second conference hosting system, of the plurality of conference hosting systems; and
a communication module configured to automatically distribute the one or more native commands to the second conference hosting system.

24. The server of claim 23, wherein the types of conference hosting systems are selected from the group consisting of a mobile bridge, an intermediate conference server, and a conference bridge.

25. The server of claim 24, wherein the control module is further configured to establish conference connections with the first conference and the second conference.

26. The server of claim 23, wherein the generic command is associated with a request to add a participant to the heterogeneous conference;
the control module is further configured to:
determine if a participant limit has been reached for the heterogeneous conference;
connect with an additional conference hosting system, if the participant limit is reached, to create an expanded heterogeneous conference;
add the participant to the expanded heterogeneous conference via the additional conference hosting system.

* * * * *